US008352936B2

(12) United States Patent
Chowdhury et al.

(10) Patent No.: US 8,352,936 B2
(45) Date of Patent: Jan. 8, 2013

(54) CREATING VIRTUAL APPLIANCES

(75) Inventors: Soudip R. Chowdhury, Kolkata (IN); Manish Gupta, New Delhi (IN); Kalapriya Kannan, Bangalore (IN); Narendran Sachindran, New Delhi (IN); Manish Sethi, New Delhi (IN); Ram Viswanathan, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 451 days.

(21) Appl. No.: 12/754,743

(22) Filed: Apr. 6, 2010

(65) Prior Publication Data

US 2011/0246830 A1    Oct. 6, 2011

(51) Int. Cl.
*G06F 9/445* (2006.01)
(52) U.S. Cl. ....................................................... 717/177
(58) Field of Classification Search .................. 717/106, 717/109, 139, 148, 177; 709/201–202, 205, 709/220, 246; 707/706, 781, 802–803; 706/46; 713/193
See application file for complete search history.

(56) References Cited

U.S. PATENT DOCUMENTS

| | | | | |
|---|---|---|---|---|
| 6,976,061 B1* | 12/2005 | Sharma | | 709/220 |
| 7,593,980 B2* | 9/2009 | Marascio et al. | | 709/201 |
| 7,917,584 B2* | 3/2011 | Arthursson | | 709/205 |
| 8,005,871 B2* | 8/2011 | Marvin et al. | | 707/802 |
| 2002/0073236 A1* | 6/2002 | Helgeson et al. | | 709/246 |
| 2007/0078988 A1 | 4/2007 | Miloushev et al. | | |
| 2009/0070752 A1* | 3/2009 | Alpern et al. | | 717/148 |
| 2009/0249279 A1 | 10/2009 | Bourdon | | |
| 2009/0249284 A1 | 10/2009 | Antosz et al. | | |

OTHER PUBLICATIONS

Tim Jones, "Virtual Appliances and Open Virtualization Format", Oct. 2009, pp. 1-9 <open-virtualiz_09.pdf>.*
VMWare, "The Open Virtual Machine Format Whitepaper for OVF Specification" Copyright 2007, p. 1-16 <ovf_whitepaper_2007.pdf>.*
Surgient Tools, www.surgient.olivedesign.com/qatestoverview Copyright 2008.
OVF tools. VMWare Studio, Virtual Machines—Virtualization Copyright 2010.
Ganguly et al. Reducing Complexity of Software Deployment with Delta Configuration. IEEE. 2007.
Sethi et al. Rapid Deployment of SOA Solutions via Automated Image Replication and Reconfiguration. IEEE. 2008.

* cited by examiner

*Primary Examiner* — Tuan A Vu
(74) *Attorney, Agent, or Firm* — Ryan, Mason & Lewis, LLP

(57) ABSTRACT

Techniques for creating a virtual appliance in a virtualization environment are provided. The techniques include implementing a framework, wherein the framework comprises a knowledge representation scheme for describing library knowledge to specify one or more libraries that are used for interaction between two or more appliance components, and using the framework to instrument the one or more libraries via use of the library knowledge, record each of one or more communication parameter values in an original environment, and package one or more disk images, wherein the one or more disk images contain the one or more instrumented libraries, the one or more communication parameter values, and translation logic, to create a virtual appliance.

17 Claims, 4 Drawing Sheets

CREATING VIRTUAL APPLIANCES

FIELD OF THE INVENTION

Embodiments of the invention generally relate to information technology, and, more particularly, to virtual appliances.

BACKGROUND OF THE INVENTION

Deployment of distributed solutions is a time and labor intensive task. By way of example, it can take multiple weeks for typical deployments. Virtual appliances can to significantly reduce the deployment effort required for distributed solutions. A virtual appliance is a packaging of pre-configured virtual machine (VM) images, along with the logic for deploying and reconfiguring the virtual machine images in a new environment. Manual creation of virtual appliances, however, is a complex and tedious activity, and existing automation approaches either operate at network level or require significant middleware knowledge.

By way of example, open virtualization format (OVF) tools require the appliance creator to have complete knowledge of products and solution configurations. Further, in such approaches, the appliance creator is expected to design the virtual appliance manually (that is, identify the variability points across environments, write scripts, write distributed configuration update workflows, etc.).

Other existing approaches include using a knowledge base about product configurations, wherein the knowledge is supplied by the product experts. In such approaches, however, the knowledge base is sub-optimal and does not consume knowledge at lower levels (for example, middleware libraries). Further, other existing approaches only support network level re-configurations without supporting operating system (OS) and middleware level re-configurations (for example, password/port changes).

SUMMARY OF THE INVENTION

Principles and embodiments of the invention provide techniques for creating virtual appliances. An exemplary method (which may be computer-implemented) for creating a virtual appliance in a virtualization environment, according to one aspect of the invention, can include steps of implementing a framework, wherein the framework comprises a knowledge representation scheme for describing library knowledge to specify one or more libraries that are used for interaction between two or more appliance components, and using the framework to instrument the one or more libraries via use of the library knowledge, record each of one or more communication parameter values in an original environment, and package one or more disk images, wherein the one or more disk images contain the one or more instrumented libraries, the one or more communication parameter values, and translation logic, to create a virtual appliance.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps.

Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
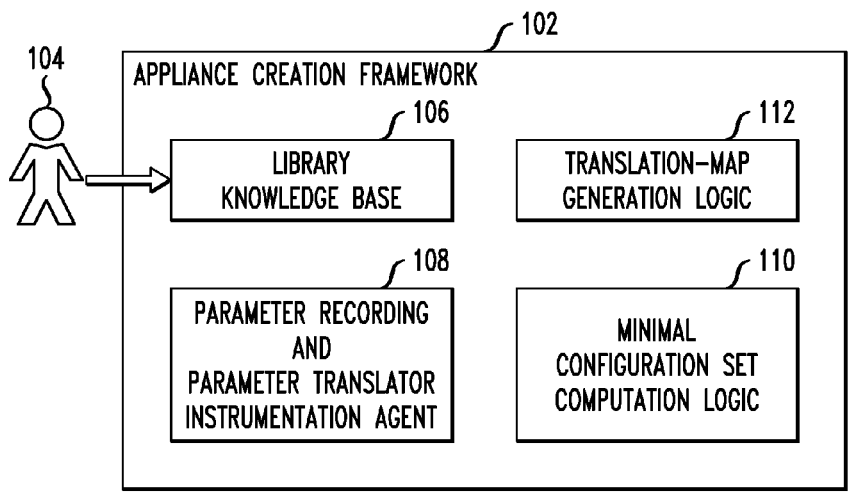
FIG. 1 is a block diagram illustrating an example framework for the techniques described herein, according to an aspect of the invention.

Principles of the invention include creating virtual appliances for handling middleware reconfigurations by instrumentation of run-time libraries. One or more embodiments of the invention include building a framework for specifying library knowledge that can be used for creating virtual appliances. This knowledge can be used, for example, for instrumenting run-time libraries so that the products that depend on these libraries can be run in new environments without any product level reconfigurations. In contrast to the disadvantages of existing approaches, the techniques described herein include allowing re-configuration of middleware level parameters such as ports and passwords, as well as significantly reducing the requirement for a product expert for the knowledge required for re-configuration of software components.

A virtual appliance, such as detailed herein, simplifies migration of a solution in a cloud environment, reducing deployment time, enhancing infrastructure utilization, as well as a disaster recovery process. Further, the techniques described herein include application-level translation for automation of solution migration and/or redeployment in new environments using library instrumentation, as well as implementing a library knowledge representation process such that a library expert can specify his or her knowledge in isolation.

As detailed herein, one or more embodiments of the invention include building virtual appliances in a virtualization environment. Additionally, one or more embodiments of the invention can include instrumenting identified libraries, used for interaction between software components, using a library knowledge base. Communication parameters (for example, dependent configuration information) can be recorded via running injected code, and the recorded communication parameters can be packaged along with virtual machine images. The injected code is, in effect, a wrapper around the original method in a library that is responsible for establishing communication between components. For instance, if the library is Java-based, the injected code might be written as a Java aspect and can be weaved into the library byte-code. Further, one or more embodiments of the invention can include presenting the user, during redeployment of a virtual machine in a new environment, the option of customizing the recorded communication parameters.

In one or more embodiments of the invention, a user need not perform manual customization. Rather, the techniques described herein include leveraging knowledge about commonly used libraries to support customization activities. Further, library-level knowledge can be captured and applied and/or reused across all virtual appliance instances that use the library.

One or more embodiments of the invention include using an input of a working composite solution installed on a set of virtual machines. Libraries to be used for interaction between software components can be identified and instrumented using a library knowledge base. Test cases can be run that cover all component interactions. During this phase, injected code records the communication parameters as tuples, wherein such parameter information covers the dependent configurations. Communication parameters are used by a component for invoking a method on a different component. For instance, if an application server needs to communicate with a database, the communication parameters might be the tuple <Database-IP, Database-Port, Database-Username, Database-Password, Database-Name>. Additionally, one or more embodiments of the invention include packaging the recorded parameter information along with the virtual machine images. A virtual machine image is a set of disk copies for the corresponding virtual machine. For example, a virtual image for a VMWare virtual machine would include one or more virtual machine disk (VMDK) files.

During re-deployment, the virtual machines can be deployed and a user can change the basic configuration (for example, via traditional approaches). One or more embodiments of the invention can also include offering a subset of the dependent configurations to be customized by applying a processing to the recorded parameter information or consuming the dependent configurations from the configuration management tool if such a tool is used. Once the user specifies new configuration values, a translation map is prepared that maps old configuration tuples to new configuration tuples. During run-time, the injected code in the libraries use the translation map to transform old values to the new values to enable the system component to communicate in a new environment.

Library knowledge representation can include, for example, ClassName#methodName [an ordered list of observable variables], as well as a tuples-variables-association. By way of example, if {V1, V2, ... Vn} and {V'1, V'2, ... V'n} are two instances of the ordered list, then Vi sameAs V'i iff Vj=V'j, for all j: $1 \leq j \leq i$. Also, the variable name 'description' is reserved for display purposes. Further, library knowledge representation can implement a method List getParams(ClassName instance, String methodName, Map<String, Object>methodParamNameValuePairs), as well as a method void setParams(ClassName instance, String methodName, List modifiedValues).

Additionally, a library-variable-association can include, for example, ClassName1#methodName1[VN$i$] sameAs ClassName2#methodName2[VNj] (an implicit condition applied is –Vi=Vj, where Vi is the value of VNi in an instance of ClassName1, and Vj is the value of VNj in an instance of ClassName2. Variables represent communication parameters. For example, JDBCDriver#connect[V1] may refer to the database internet protocol (IP) while MQDriver#connect [V1'] may refer to a message queue (MQ) IP address. Both variables refer to an IP address of a machine and should be treated as the same variable if their values match. This is done in order to remove any redundancy while prompting the user for new values.

As described herein, one or more embodiments of the invention also include using library knowledge. During a capture phase, injected code invokes getParams and records each tuple, and the recording of tuples is packaged with the virtual machine images. During re-deployment, using the tuples-variables-association and library-variable-association, one or more embodiments of the invention can determine unique variable values that can be presented to the user for propagation of customized configuration values. Additionally, user-supplied new values can be used for preparing the configuration value translation map. By way of example, the library method can get called with old configuration values, and the injected code in the library can invoke getParams method and compare the list returned in the translation map. Further, the injected code in the library can invoke setParams method with the corresponding value found in the translation map.

FIG. 1 is a block diagram illustrating an example framework for the techniques described herein, according to an aspect of the invention. By way of illustration, FIG. 1 depicts an appliance creating framework 102, which includes a library knowledge base 106, a parameter recording and parameter translator instrumentation agent 108, a minimal configuration set computation logic component 110 and a translation-map generation logic component 112. As illustrated in FIG. 1, a library expert 104 can provide input to the library knowledge base 106. Providing input to the library knowledge base is, per library expert, a one-time activity. This knowledge can be used later during functioning of the framework, as detailed herein.

Figure 2:
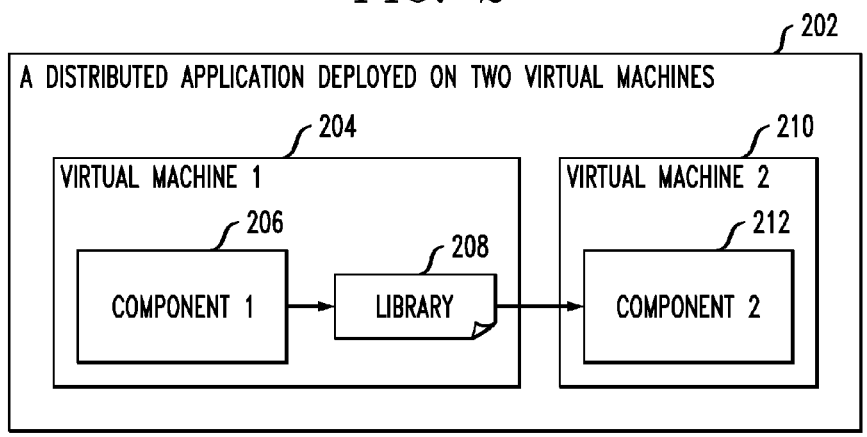
FIG. 2 is a block diagram illustrating a sample input that can be acted on by the framework, according to an aspect of the invention.

FIG. 2 is a block diagram illustrating a sample input that can be acted on by the framework, according to an aspect of the invention. By way of illustration, FIG. 2 depicts the sample input 202 in the form of a distributed/composite application deployed on two virtual machines. The input includes virtual machine 1 (item 204), which includes component 1 (item 206) and library 208. The input also includes virtual machine 2 (item 210), which includes component 2 (item 212). As illustrated in FIG. 2, component 206 uses library 208 in order to communicate with component 212.

Figure 3:
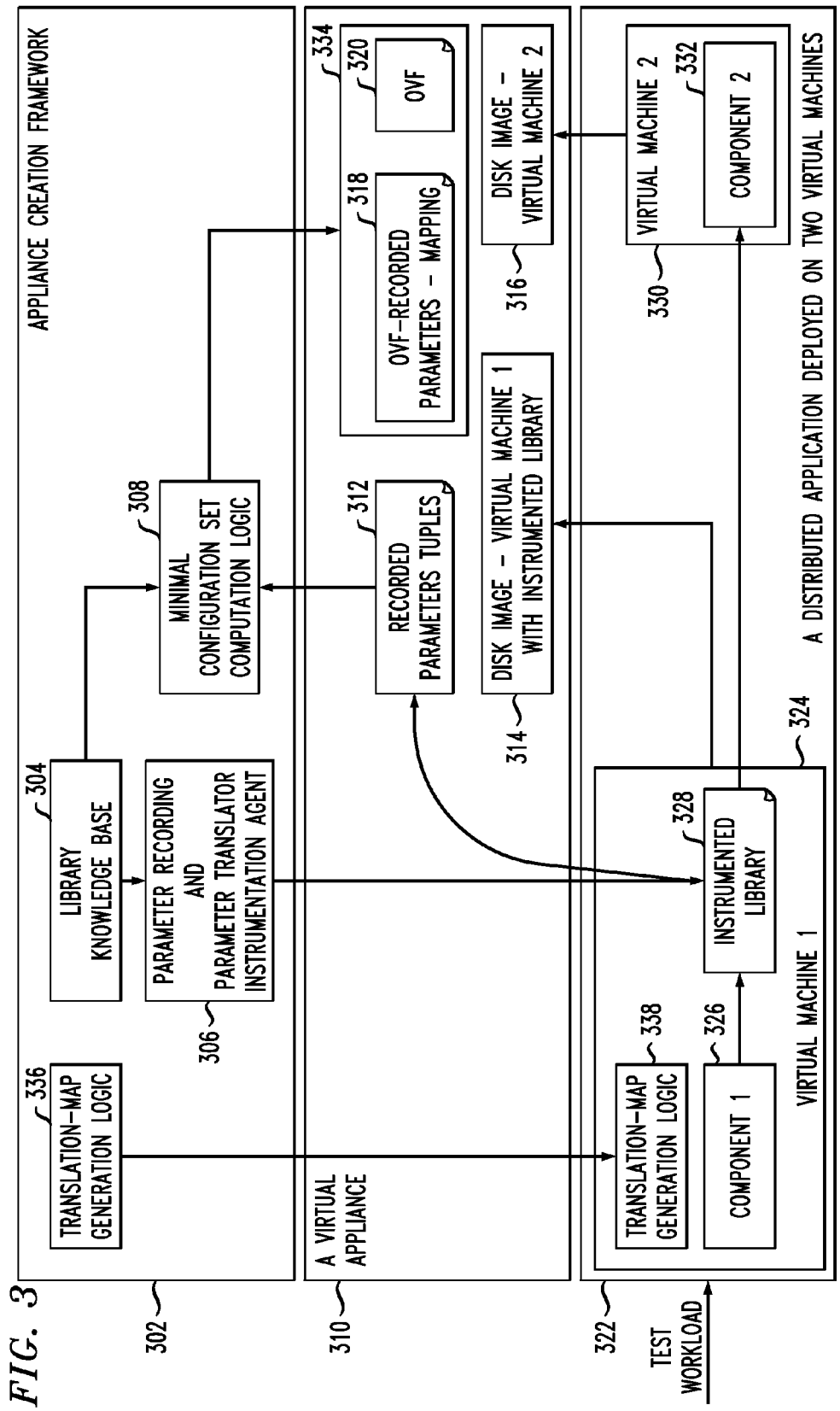
FIG. 3 is a block diagram illustrating virtual appliance creation, according to an aspect of the invention.

FIG. 3 is a block diagram illustrating virtual appliance creation, according to an aspect of the invention. As described, FIG. 3 depicts the framework 302 acting on input 202 (as depicted in FIG. 2) to output a virtual appliance 310. By way of illustration, FIG. 3 depicts an appliance creation framework 302, which includes a library knowledge base 304, a parameter recording and parameter translator instrumentation agent 306, a minimal configuration set computation logic component 308 and a translation-map generation logic component 336. The framework 302 is the same as the framework 102 shown here in the context of its operations.

The framework 302 acts on sample input 202 and changes the state of the input to 322. This state change includes pushing the translation-map generation logic (item 338) to virtual machine (item 324) and transforming library 208 into instrumented library (item 328).

Further acting on modified input 322, the framework 302 produces a virtual appliance 310 (that is, an output). The virtual appliance 310 includes a recorded parameters tuples component 312, a disk image (virtual machine 1 with instrumented library) 314, a disk image (virtual machine 2) 316, and a component 334 that includes an OVF component 320 and mappings between 320 and 312, an OVF-recorded parameters-mapping component 318.

As noted above, in FIG. 3, item 302 is the framework (same as 102 in FIG. 1), item 322 is a sample input to the framework (same as 202 in FIG. 2), and item 310 is the output to the corresponding input. The flow of events in the context of FIG. 3 is as follows.

A library 208 is instrumented by a parameter recording and parameter translator instrumentation agent 306, which results in instrumented library 328. Parameter recording and parameter translator instrumentation agent 306 consumes library knowledge from library knowledge base 304 to achieve this. A test workload is executed on modified sample input 322. This workload makes component 326 use library 328 for communicating with input 322. Library 328 produces recorded parameters tuples component 312. This happens due to instrumented code present in 328 (performed in the first step of this described sequence of events.)

Minimal configuration set computation logic component 308 takes recorded parameters tuples component 312 as its input and produces component 334 as its output. Minimal configuration set computation logic component 308 consumes library knowledge from library knowledge base 304 to achieve this. The logic of preparing the translation map is pushed inside virtual machines that contain instrumented libraries. Virtual disks of VM 324 and VM 330 (which includes component 332) result in disk image 314 and disk image 316, respectively. As such, virtual appliance 310 is the output of the framework.

Figure 4:
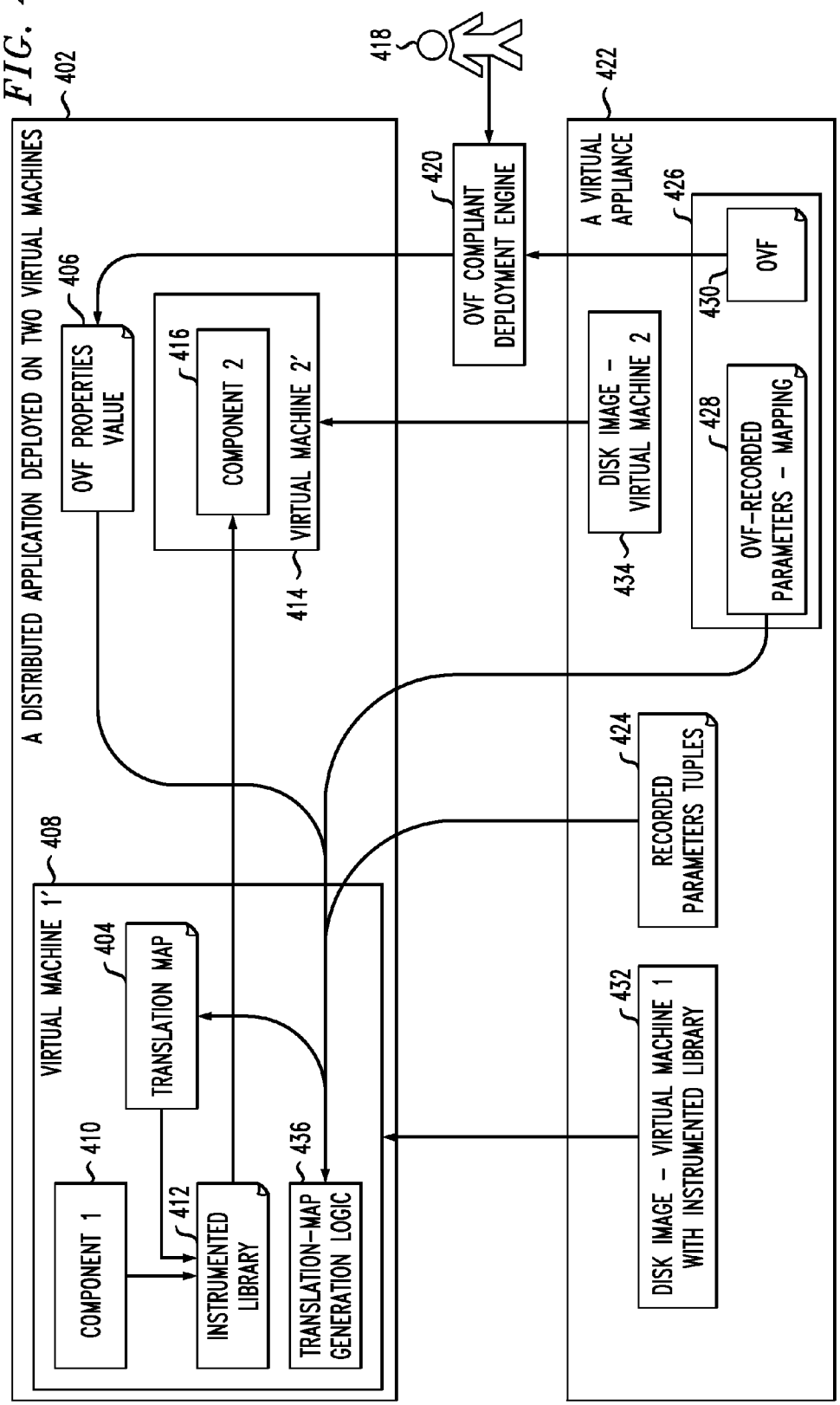
FIG. 4 is a block diagram illustrating example deployment of an appliance, according to an aspect of the invention.

FIG. 4 is a block diagram illustrating example deployment of an appliance, according to an aspect of the invention. By way of illustration, FIG. 4 depicts how a sample output of the framework is deployed using any OVF standard compliant deployment engine. In FIG. 4, item 420 is a sample OVF compliant deployment engine, item 422 is a sample input to engine 420 (this can be, by way of illustration, the output of the framework described in connection with FIG. 3 above, that is, item 310), and item 402 is the output of 420's deployment operation on input 422. Also, during this operation, deployer 418 can provide manual inputs. The flow for deployment, as depicted in FIG. 4, is as follows.

Engine 420 introspects OVF component 430 (which is contained within component 426 along with an OVF-recorded parameters-mapping component 428). This results in the creation of VM 408 and VM 414 from disk image 432 and disk image 434, respectively. OVF component 430 is also used for taking inputs from deployer 418 and results in OVF properties value component 406. During deployment, OVF properties value component 406, recorded parameters tuples component 424, and OVF-recorded parameters-mapping component 428 are supplied as input to the translation-map generation logic 436 by virtual compact disc and/or virtual floppy. OVF properties value component 406, in conjunction with components 424 and 428, is used to produce translation map 404 via the translation map generation logic component 436 inside virtual machine 408.

FIG. 4 also highlights the operation of output 402 after it has been deployed. When component 410 uses library 412 for communicating with component 416, component 410 still uses old values picking up from its configurations. However, library 412 uses translation map 404 and translates these communication parameters to the one in the new environment.

Figure 5:
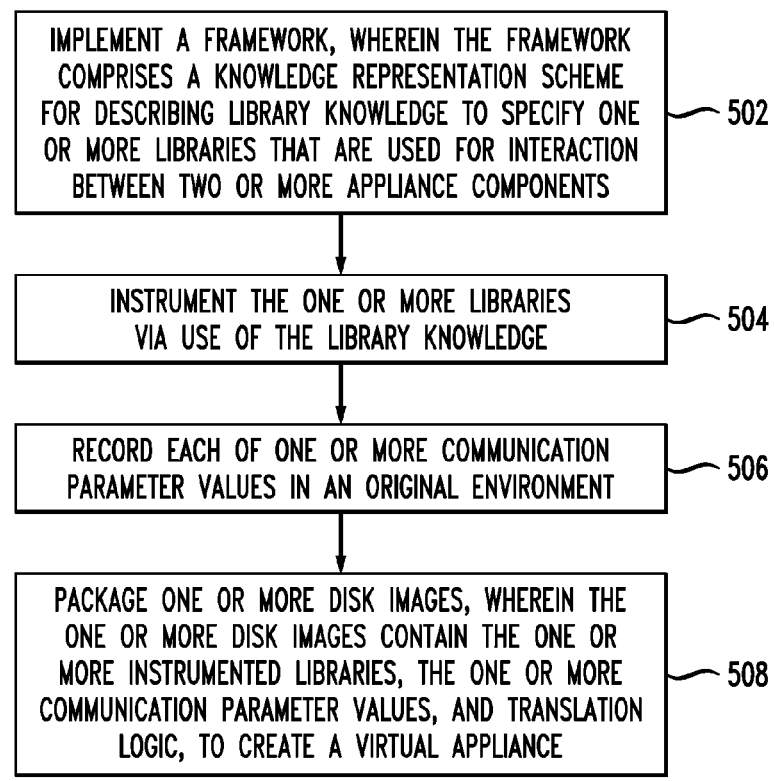
FIG. 5 is a flow diagram illustrating techniques for creating a virtual appliance in a virtualization environment, according to an embodiment of the invention.

FIG. 5 is a flow diagram illustrating techniques for creating a virtual appliance in a virtualization environment, according to an embodiment of the present invention. Step 502 includes implementing a framework, wherein the framework comprises a knowledge representation scheme for describing library knowledge to specify one or more libraries that are used for interaction between two or more appliance components. The components are part of the virtual machine and will be captured within the disk images of the appliance. The framework is then used to perform steps 504, 506 and 508. Step 504 includes instrumenting the one or more libraries via use of the library knowledge.

Step 506 includes recording each of one or more communication parameter values in an original environment. Step 508 includes packaging one or more disk images, wherein the one or more disk images contain the one or more instrumented libraries, the one or more communication parameter values, and translation logic, to create a virtual appliance. Packaging can include using logic that uses the library knowledge for creating a minimal set of configurations (represented, for example, in open virtualization format (OVF)).

The techniques depicted in FIG. 5 can also include enabling, via the created virtual appliance, translation of the one or more communication parameter values to one or more new communication parameter values when running in a new environment so that each of one or more products that depend on the one or more libraries can be run in the new environment without product level reconfiguration. The translation can include, for example, facilitating re-configuration of one or more middleware level parameters (such as, for example, ports and passwords), as well as transforming old values to new values for making an appliance component communicate in a new environment.

Also, the techniques depicted in FIG. 5 can include running test cases that cover all component interactions, and during the running of the test cases, using injected code to record one or more communication parameters, wherein the communication parameters cover each dependent configuration of the virtual appliance. One or more embodiments of the invention additionally include packaging the recorded communication parameters with one or more virtual machine images, as well as providing a minimal subset of the (dependent) customizable configurations by applying a processing to the recorded communication parameters. The configurations in this minimal sub-set depend on other configurations (that is, independent configurations). These independent configurations may not be included in the recorded configurations. Further, the techniques depicted in FIG. 5 can include a processing for fixing the independent configurations. This processing may include consuming one or more corresponding configuration values from a configuration management tool, packaging relevant scripts during appliance creation, or manually fixing the configurations.

The techniques depicted in FIG. 5 can also, as described herein, include providing a system, wherein the system includes distinct software modules, each of the distinct software modules being embodied on a tangible computer-readable recordable storage medium. The distinct software modules can include, for example, a library knowledge base module, a parameter recording and parameter translator instrumentation agent module, a translation-map generation logic module and a minimal configuration set computation logic module.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 6:
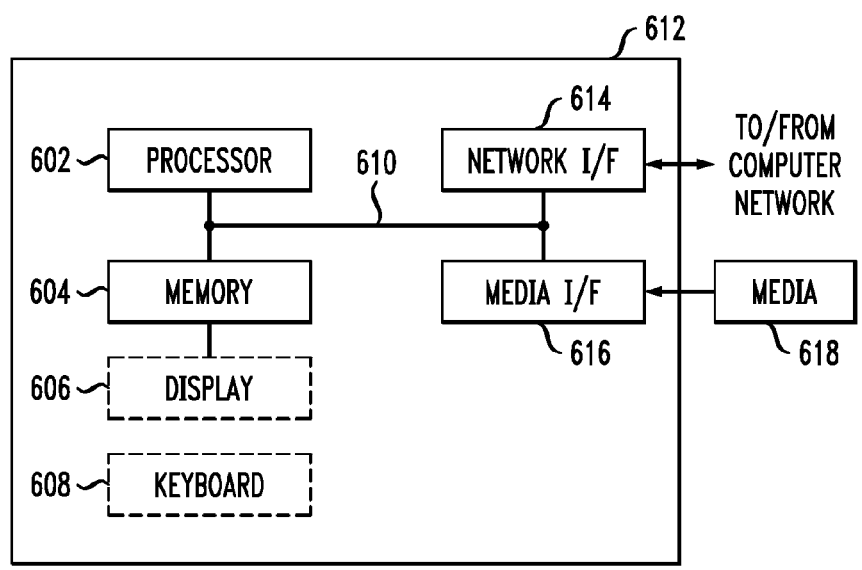
FIG. 6 is a system diagram of an exemplary computer system on which at least one embodiment of the invention can be implemented.

One or more embodiments can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 618 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction implementation system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction implementation system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIGS. 1-4. The method steps can then be carried out using the distinct software modules and/or sub-modules of the system, as described above, executing on one or more hardware processors 602. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, application-level translation for automation of solution migration and/or redeployment in new environments using library instrumentation.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A computer-implemented method for creating a virtual appliance in a virtualization environment, the virtual appliance representing hardware and software aspects or products of an underlying target environment, wherein the method comprises:

implementing a framework, wherein the framework comprises a knowledge representation scheme for describing library knowledge to specify one or more libraries that are used for interaction between two or more appliance components;

using the framework to:

instrument, using an instrumenting module, the one or more libraries via use of the library knowledge;

record, using a parameter recording module, each of one or more communication parameter values in an original environment; and package, using a packaging module, one or more disk images, wherein the one or more disk images contain the one or more instrumented libraries, the one or more recorded communication parameter values, an open virtualization format (OVF) component, a map that implements mappings between the OVF component and the one or more communication parameter values, and a translation logic, to create a virtual appliance for distribution and deployment at a target new environment; and enabling, via the created virtual appliance and the translation logic, translation of the one or more communication parameter values to one or more new communication parameter values when running in a new environment so that each of one or more target environment products that depend on the one or more libraries can be run in the new environment without any preconfigured product level reconfiguration.

2. The computer-implemented method of claim 1, wherein the translation comprises transforming one or more old values to one or more new values for making an appliance component communicate in a new environment.

3. The computer-implemented method of claim 1, further comprising:

running one or more test cases that cover all component interactions; and during the running of the one or more test cases, using injected code to record one or more communication parameters, wherein the one or more communication parameters cover each of one or more dependent configurations of the virtual appliance.

4. The computer-implemented method of claim 3, further comprising providing a minimal subset of the one or more configurations to be customized by applying a processing to the one or more recorded communication parameters.

5. The computer-implemented method of claim 1, wherein packaging comprises using logic that uses the library knowledge for creating a minimal set of configurations.

6. The computer-implemented method of claim 1, further comprising providing a system, wherein the system comprises one or more distinct software modules, each of the one or more distinct software modules being embodied on a tangible computer-readable recordable storage medium, and wherein the one or more distinct software modules comprise a library knowledge base module, a parameter recording and parameter translator instrumentation agent module, a translation-map generation logic module and a minimal configuration set computation logic module.

7. A computer program product comprising a tangible computer readable recordable storage medium including computer useable program code for creating a virtual appliance in a virtualization environment, the virtual appliance representing hardware and software aspects or products of an underlying target environment, the computer program product including:

computer useable program code for implementing a framework, wherein the framework comprises a knowledge representation scheme for describing library knowledge to specify one or more libraries that are used for interaction between two or more appliance components;

computer useable program code for using the framework, wherein the computer useable program code for using the framework comprises:

computer useable program code for instrumenting, using an instrumenting module, the one or more libraries via use of the library knowledge;

computer useable program code for recording, using a parameter recording module, each of one or more communication parameter values in an original environment; and computer useable program code for packaging, using a packaging module, one or more disk images, wherein the one or more disk images contain the one or more instrumented libraries, the one or more recorded communication parameter values, an open virtualization format (OVF) component, a map that implements mappings between the OVF component and the one or more communication parameter values, and a translation logic, to create a virtual appliance for distribution and deployment at a target new environment; and computer useable program code for enabling, via the created virtual appliance and the translation logic, translation of the one or more communication parameter values to one or more new communication parameter values when running in a new environment so that each of one or more target environment products that depend on the one or more libraries can be run in the new environment without any preconfigured product level reconfiguration.

8. The computer program product of claim 7, wherein the computer useable program code for packaging comprises computer useable program code for using logic that uses the library knowledge for creating a minimal set of configurations.

9. The computer program product of claim 7, wherein the translation further comprises computer useable program code for transforming one or more old values to one or more new values for making an appliance component communicate in a new environment.

10. The computer program product of claim 7, further comprising:

computer useable program code for running one or more test cases that cover all component interactions; and during the running of the one or more test cases, computer useable program code for using injected code to record one or more communication parameters, wherein the one or more communication parameters cover each of one or more dependent configurations of the virtual appliance.

11. The computer program product of claim 10, further comprising computer useable program code for providing a minimal subset of the one or more configurations to be customized by applying a processing to the one or more recorded communication parameters.

12. A system for creating a virtual appliance in a virtualization environment, the virtual appliance representing hardware and software aspects or products of an underlying target environment, comprising:

a memory; and at least one processor coupled to the memory and operative to:

implement a framework, wherein the framework comprises a knowledge representation scheme for describing library knowledge to specify one or more libraries that are used for interaction between two or more appliance components;

use the framework to:

instrument, using an instrumenting module, the one or more libraries via use of the library knowledge;

record, using a parameter recording module, each of one or more communication parameter values in an original environment; and package, using a packaging module, one or more disk images, wherein the one or more disk images contain the one or more instrumented libraries, the one or more recorded communication parameter values, an open virtualization format (OVF) component, a map that implements mappings between the OVF component and the one or more communication parameter values, and a translation logic, to create a virtual appliance for distribution and deployment at a target new environment; and enable, via the created virtual appliance and the translation logic, translation of the one or more communication parameter values to one or more new communication parameter values when running in a new environment so that each of one or more target environment products that depend on the one or more libraries can be run in the new environment without any preconfigured product level reconfiguration.

13. The system of claim 12, wherein the at least one processor coupled to the memory operative to package is further operative to use logic that uses the library knowledge for creating a minimal set of configurations.

14. The system of claim 12, wherein the translation comprises transforming one or more old values to one or more new values for making an appliance component communicate in a new environment.

15. The system of claim 12, wherein the at least one processor coupled to the memory is further operative to:

run one or more test cases that cover all component interactions; and during the running of the one or more test cases, use injected code to record one or more communication parameters, wherein the one or more communication parameters cover each of one or more dependent configurations of the virtual appliance.

16. The system of claim 15, wherein the at least one processor coupled to the memory is further operative to provide a minimal subset of the one or more configurations to be customized by applying a processing to the one or more recorded communication parameters.

17. The system of claim 12, further comprising a tangible computer-readable recordable storage medium having one or more distinct software modules embodied thereon, wherein the one or more distinct software modules comprise a library knowledge base module, a parameter recording and parameter translator instrumentation agent module, a translation-map generation logic module and a minimal configuration set computation logic module.

\* \* \* \* \*